United States Patent
Chen et al.

(10) Patent No.: US 6,910,839 B2
(45) Date of Patent: Jun. 28, 2005

(54) INTERNAL, ACTIVE, AND COMPENSATORY METHOD AND DEVICE FOR THE ROTATIONAL MAIN-SHAFT OF A CUTTING TOOL WITH AXIAL BIAS-AND-SWING

(75) Inventors: Chang-Ming Chen, Hsinchu (TW); Lai-Sheng Chen, Hsinchu (TW); Wei-Han Wang, Hsinchu (TW); Jung-Hong Hwang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 555 days.

(21) Appl. No.: 10/180,038

(22) Filed: Jun. 27, 2002

(65) Prior Publication Data

US 2003/0061921 A1 Apr. 3, 2003

(30) Foreign Application Priority Data

Sep. 28, 2001 (TW) ........................................ 90124015 A (51) Int. Cl.$^7$ .............................. B23C 1/00; B23Q 5/04
(52) U.S. Cl. ........................ 409/231; 409/233; 408/124
(58) Field of Search .................................. 409/231, 232, 409/233, 234, 207; 408/238, 129, 124; 451/121, 124, 119, 120; 310/12, 90.5; 125/13.01; 83/13

(56) References Cited

U.S. PATENT DOCUMENTS

| | | | | |
|---|---|---|---|---|
| 4,309,925 A | * | 1/1982 | Mottershead et al. .......... 82/12 |
| 4,900,201 A | * | 2/1990 | Danton et al. ............... 409/184 |
| 5,679,989 A | * | 10/1997 | Buscher et al. ............... 310/89 |
| 5,879,113 A | * | 3/1999 | Ueyama et al. ............. 409/231 |
| 5,997,223 A | * | 12/1999 | Kosmowski ................. 409/231 |
| 6,062,778 A | * | 5/2000 | Szuba et al. ................. 408/156 |
| 6,102,023 A | * | 8/2000 | Ishiwata et al. ......... 125/13.01 |
| 6,280,124 B1 | * | 8/2001 | Ammann ..................... 408/124 |
| 6,474,914 B1 | * | 11/2002 | Lang .......................... 409/231 |
| 6,566,775 B1 | * | 5/2003 | Fradella ..................... 310/90.5 |
| 6,585,462 B1 | * | 7/2003 | Goransson .................. 409/231 |

* cited by examiner

Primary Examiner—Derris N. Banks
Assistant Examiner—Dana Ross
(74) Attorney, Agent, or Firm—Troxell Law Office, PLLC (57) ABSTRACT

The invention, relating to an internal, active, compensatory and method and device for the rotational main-shaft of a cutting tool with axial bias-and-swing, mainly applies an active technique to a gas-floating main-shaft to thereby control its bias-and-swing. A sensor at the exterior of the main-shaft directly measures the axial bias-and-swing of the cutting tool. Taking the measured data as feedback signals, the cutting point of the cutting tool is maintained at an axial positioning accuracy that is predetermined. Further, the invention is arranged with an electromagnetic controlling module to the mandrel's tail end at the interior of the main-shaft for taking non-contacting magnetic force to finely tune the axial position of the mandrel, such that an active compensatory function of the axial position of the cutting point of a cutting tool in action is achieved.

18 Claims, 5 Drawing Sheets

INTERNAL, ACTIVE, AND COMPENSATORY METHOD AND DEVICE FOR THE ROTATIONAL MAIN-SHAFT OF A CUTTING TOOL WITH AXIAL BIAS-AND-SWING

FIELD OF THE INVENTION

The invention relates to an internal, active, and compensatory method and device for the rotational main-shaft of a cutting tool with axial bias-and-swing, particularly to a kind of method and device, which is adapted to a gas-floating main-shaft device, and in which a sensor directly measures the axial bias-and-swing of a cutting tool as a feedback signal, by which the cutting tool is driven to compensate its displacement at the axis from the interior of the gas-floating main-shaft device, such that the cutting point of the cutting tool is further controlled to an appropriate accuracy of axial position.

BACKGROUND OF THE INVENTION

When a traditional cutting machine for hard-and-brittle materials processes a cutting procedure on a hard-and-brittle material work-piece, such as: wafer, glass, or ceramic material, etc., it is easy to generate cutting-route fissures and breaking situation on the back of the work-piece. The reason: when the main-shaft processes a cutting-off procedure, it causes mistake of cutting-in position, instability of cutting route, and great variation of cutting force, because of the bias-and-swing of the main shaft of the cutting tool, assembling accumulation error of cutter and fixture, and entirety deformation under high speed; further, since the axial bias-and-swing bumps the edges of the cutting routes with high frequency at the side surface of the external edges of the cutting tool of cutting point, so that the cut work-piece generates a damage of brittleness.

In order to solve the problem of the vibration and the bias-and-swing generated by the cutting tools when the main shaft is rotated in high speed for processing a cutting-off procedure, a kind of gas-floating main-shaft device supplying more steady position of main shaft under the circumstance of rotation of high speed has been developed. The relative technique of this kind of gas-floating main-shaft device may be referred in the U.S. Pat. No. 5,997,223. However, although this kind of gas-floating main-shaft device may be provided for a higher stability of main shaft during the rotation of high speed, but even the stability of the main-shaft itself is increased greatly and, since the diameter of a common cutting tool formed as a disc shape is around 50~100 mm, so the outer edge of the cutting tool itself may still generate a phenomenon of reciprocation of bias-and-swing, of which amplitude may reach around 10~25 $\mu$m, when it is under the process of a cutting load of high-speed rotation (the rotation speed can exceed 10,000 rpm, even reach more than 60,000 rpm), such that the cutting tool will relatively cause an axial bump in bias-and-swing direction to the work-piece itself to be processed. Therefore, it is still impossible for this kind of rotational main-shaft device according to prior arts to avoid the generation of an axial displacement of bias-and-swing relative to the main shaft at the outer edge of the cutting tool, so that the fissures in cutting route and the damage phenomenon on the back of the work-piece described hereinbefore are still happened continuously.

Therefore, the Japanese factory—DISCO Company, of which the occupation rate in the global market of the cutting machine for the hard-and-brittle materials of wafer exceeds 60%, had developed a cutting machine in double axes aiming in solving such kind of problem (please refer to U.S. Pat. No. 6,102,023). Applying a cutting method of ladder or inverse angle in double axes for increasing the cutting quality, its first main-shaft processes a motion of cutting shallow trough for the purpose of guiding the second main-shaft to process in following to the fixed cutting-in position and cutting route of the shallow trough such that, when the second main-shaft is under the process of cut-off, the fissures of the edge of the cutting route and the damage on the back of the wafer created by the axial bias-and-swing of the main shaft are reduced. Its shortcomings: the work-piece needs two rounds of cutting processes, the cutting facilities are required for installing two sets of gas-floating main-shaft system, and the facility cost and the difficulty of system control are thereby multiplied relatively, so this is not a very good solution.

Another referring data may refer to U.S. Pat. Nos. 4,309,925 and 6,062,778 in addition. These two cases of prior arts are all relative to the technique and the device of the [Radial Position] of the [Boring Tool], which is different apparently from the axial positioning device and technique for cutting tool pursued by the present invention. However, claiming in advance, these two cases of prior arts, all processing the axial position of main shaft by sensing the bias of the [Main Shaft] itself, do not completely disclose the technical characteristics of the present invention.

SUMMARY OF THE INVENTION

The main object of the invention is to provide an internal, active, and compensatory method and device for the axial bias-and-swing of the main shaft of a cutting tool, which may apply a set of main-shaft system to process only one round of cutting procedure but, in the meantime, the degree of fissure in the cutting route and the damage in the back of work-piece is reduced, and it may be provided for a better processing quality than that of the traditional cutting machine for hard-and-brittle materials.

Another object of the invention is to provide an internal, active, and compensatory method and device for the axial bias-and-swing of the main shaft of a cutting tool, which may apply an active controlling technique of electromagnetic force in the interior of the main body of the main shaft used for hard-and-brittle materials to make the mandrel of main shaft and the cutting tool together process a motion of axial micro-displacement to generate an axial position compensation of the cutting point of cutting tool to make the main shaft and cutting tool to possess active bias-and-swing control to process the rotational cutting work in high speed and in more steady situation. Since the contour structure of the gas-floating main-shaft is not needed to be changed according to the invention, so the structural complication of the main shaft and the manufacture difficulty are decreased greatly and, further, the invention has the advantage of lower cost by relatively comparing with the cutting system with double main axes and, therefore, a better cutting quality is thereby achieved.

Another further object of the invention is to provide an internal, active, and compensatory method and device for the axial bias-and-swing of the main shaft of a cutting tool, which may apply a non-contacting sensor to directly measure the quantity of axial bias-and-swing near the outer edge of the cutting tool and take the measured quantity of axial bias-and-swing as the feedback signal to process the control of the compensatory displacement for the main shaft, such that it may counteract the influence of the phenomenon of the axial bias-and-swing caused by the deformation in the outer edge of the cutting tool during the cutting process of high-speed rotation and, therefore, a better cutting quality is further achieved.

To achieve above objects, the invention is to provide an internal, active, compensatory device for the axial bias-and-swing of the main shaft of a cutting tool, wherein the main shaft is comprised of a mandrel, a cutting tool connected to the front end of the mandrel, a motor rotor connected to the tail end of the mandrel to bring along its rotation, and a main-shaft main body covered at the outside of the mandrel to provide a structural rigidity. Along the axial direction, the mandrel may make a linear displacement of small amplitude relative to the main body. The active compensatory device is comprised of a non-contacting sensor, a magnetic element, an electromagnetic element, and an electromagnetic controlling module. The sensor, connected to the main body and relative to the cutting tool, may sense the axial displacement of bias-and-swing relative to the main body. The magnetic element is arranged at the tail end of the mandrel and is rotated synchronically with it. The electromagnetic element, arranged at the interior of the main body corresponding to the magnetic element and kept an appropriate space (or gap) with the magnetic element, may generate a magnetic force corresponding to an input of electric power for further producing an axial force to the magnetic element, such that the mandrel makes an axial displacement of small amplitude relative to the main body. The electromagnetic controlling module, connected to the electromagnetic element and located at the exterior of the main shaft, may receive the quantity of the axial displacement of bias-and-swing transferred from the sensor and thereby control the electric power input to the electromagnetic element. Therefore, by directly measuring the quantity of the axial displacement of the bias-and-swing of the cutting tool by the sensor and thereby controlling the axial compensatory displacement of the mandrel, it may be assured that the cutting point of the cutting tool is always maintained at the predetermined route and position, such that the degree of the fissure of cutting route and the damage on the back of the work-piece caused by the axial bias-and-swing of the cutting tool may be reduced greatly. Only is one set of main shaft needed for processing one round of cut to thereby achieve a better cutting quality and completely are the shortcomings of a single main shaft or a double main shaft system according to the prior arts overcome.

Preferably, the main shaft is further comprised of a main controller, which is connected to the stator of the motor to control the rotation of the mandrel, and a sub-controller, which is connected to the main controller and is located at the exterior of the main shaft. The main controller may transfer the data of the rotation speed of the rotational mandrel to the sub-controller, which may decide the detecting frequency of the cutting tool measured by the sensor according to the received data of the rotation speed.

Preferably, after the electromagnetic controlling module receiving the quantity of axial displacement of the bias-and-swing transferred from the sensor, it will compare the displacement quantity with a value of tolerating range and a value of alarming range that are determined in advance. When the displacement quantity exceeds the value of tolerating range, the electromagnetic controlling module will then process a control of electric power input to the electromagnetic element and, while the displacement quantity exceeds the value of alarming range, the electromagnetic controlling module will set off alarming signals.

To achieve above described objects, the internal, active, and compensatory method for the axial bias-and-swing of the main shaft of a cutting tool according to the present invention is comprised of following steps:

(A) Provide an active compensatory device to be arranged at a main-shaft device, which is comprised of a mandrel, a cutting tool connected to a front end of the mandrel, and a motor rotor connected to the tail end of the mandrel to bring along the mandrel and rotate the cutting tool. The active compensatory device is comprised of a sensor that may sense the quantity of the axial displacement of the bias-and-swing of the cutting tool, an actuation module that may drive the mandrel to process an axial displacement of small amplitude, and an electromagnetic module that may receive the quantity of axial displacement of the bias-and-swing transferred from the sensor and thereby control the actuation module;

(B) The sensor detects the quantity of the axial displacement of the bias-and-swing of the cutting tool and transfers the displacement quantity of the bias-and-swing to the electromagnetic controlling unit;

(C) According to the displacement quantity of the bias-and-swing, the electromagnetic module correspondingly calculates the displacement quantity of the axial compensation;

(D) The electromagnetic controlling module controls the actuation module to drive the mandrel to process the axial displacement of the displacement quantity of compensation.

Preferably, between Step (A) and Step (B), there are further included following steps:

(A1) Detect the rotation speed of the cutting tool;

(A2) According to the rotation speed of the cutting tool, the electromagnetic controlling module decides the detecting frequency sensed by the sensor from the cutting tool.

Preferably, between Step (B) and Step (C), there are further included following steps:

(B1) Compare the displacement quantity of the bias-and-swing with a value of tolerating range that is predetermined and, when the displacement quantity of the bias-and-swing exceeds the value of tolerating range, the electromagnetic controlling module will then execute the Step (C);

(B2) Compare the displacement quantity of the bias-and-swing with a value of alarming range that is predetermined and, when the displacement quantity of the bias-and-swing exceeds the value of alarming range, the electromagnetic controlling module will set off alarming signals.

DETAILED DESCRIPTION OF THE INVENTION

According to the invention, the internal, active, and compensatory method and device for the rotational main-shaft of a cutting tool with axial bias-and-swing mainly applies an active technique to the interior of a gas-floating main-shaft to thereby control its bias-and-swing, wherein a sensor at the exterior of the main-shaft directly measures the axial bias-and-swing of the cutting tool and, by taking the measured data as feedback signals, the cutting point of the cutting tool is maintained at an axial positioning accuracy that is predetermined. Further, the invention is additionally arranged with an electromagnetic controlling module to the mandrel's tail end at the interior of the main-shaft for taking non-contacting actuation module (i.e., the magnetic force) to finely tune the axial position of the mandrel, such that an active compensatory function of the axial position of the cutting point of a cutting tool in action is achieved. A preferable embodiment is presented hereinafter in a detailed way to describe the device, the method, the motion manner, and the achievable function of the invention.

Figure 1A:
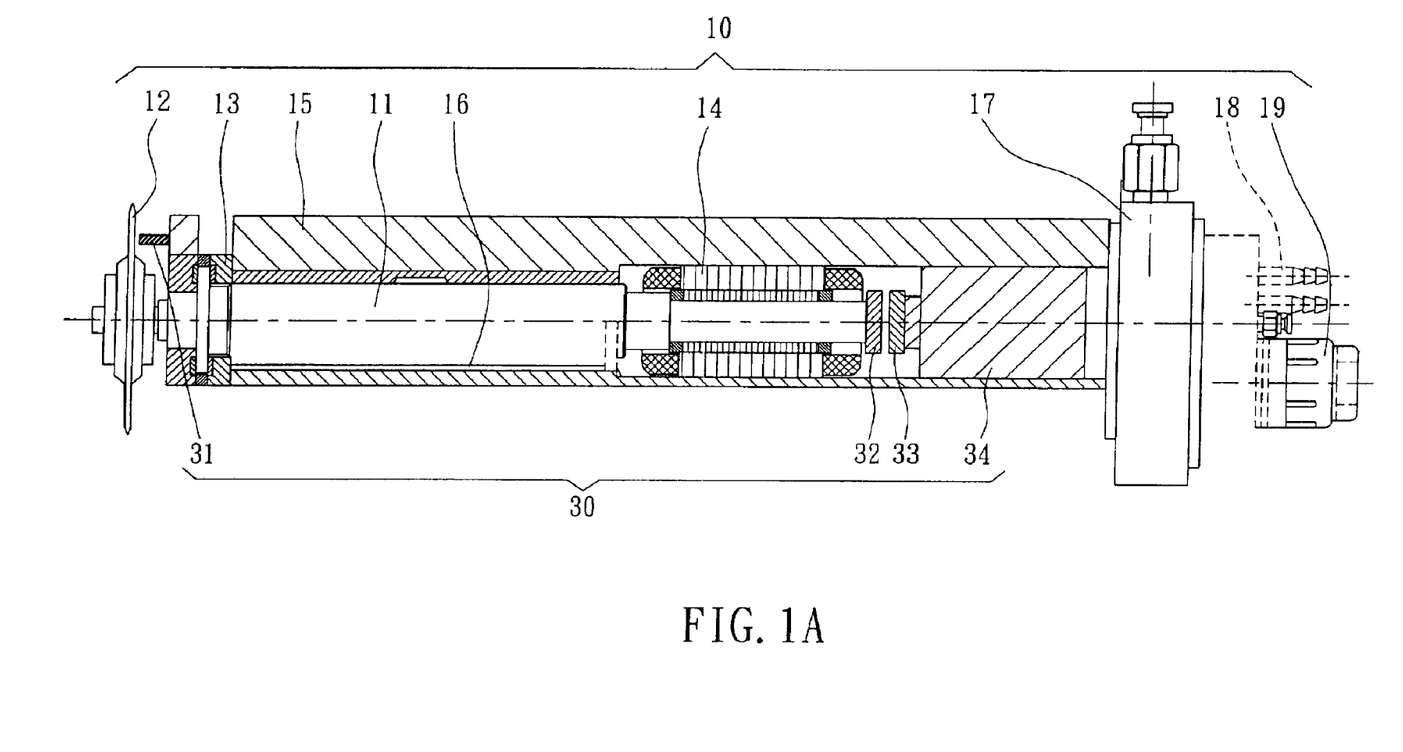
FIG. 1A is a cross-sectional illustration for the preferable embodiment of the internal, active, and compensatory device for the axial bias-and-swing of the main shaft of a cutting tool according to the present invention.
Figure 1B:
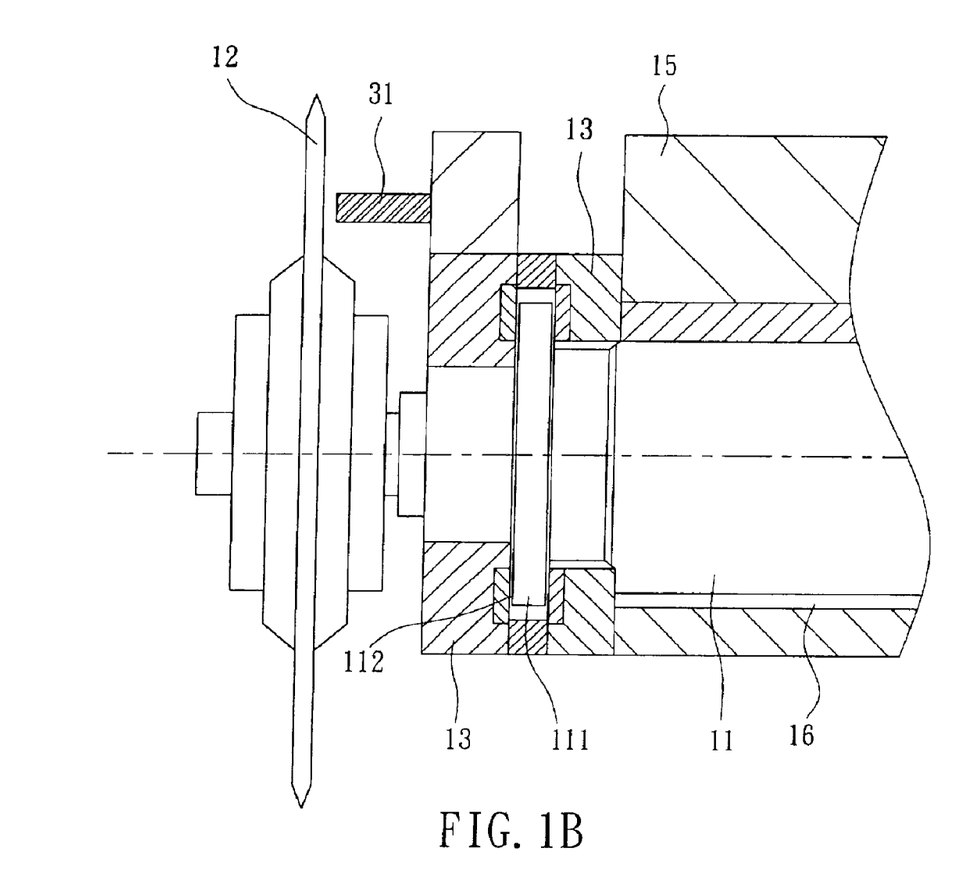
FIG. 1B is a partially enlarged illustration for the push-proof bearing part of the mandrel in FIG. 1A.
Figure 2:
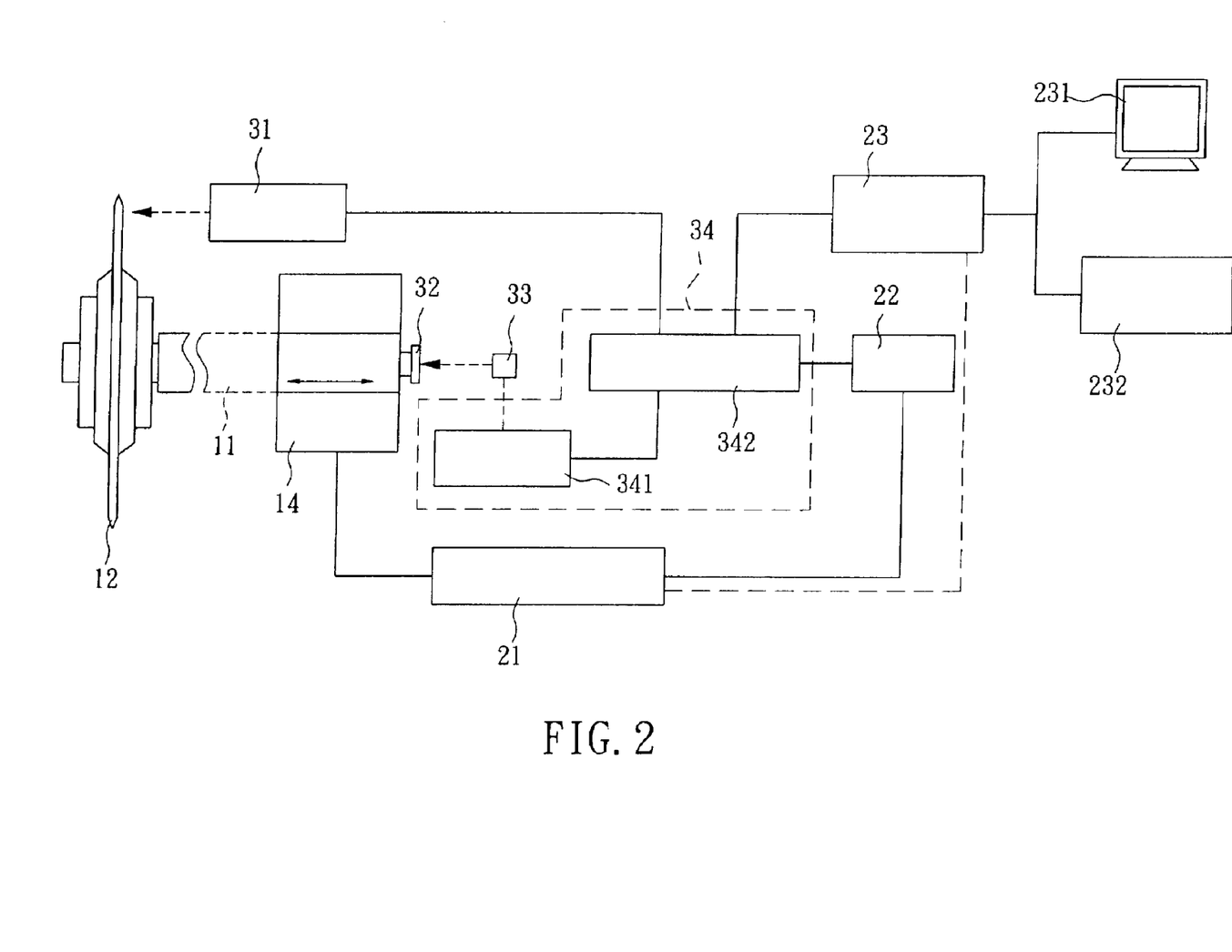
FIG. 2 is a block diagram illustration for the internal, active, and compensatory device for the axial bias-and-swing of the main shaft of a cutting tool according to the invention.

Please refer to FIG. 1A, FIG. 1B, and FIG. 2, which show a preferable embodiment for the internal, active, and compensatory device for the axial bias-and-swing of the rotational main-shaft of a cutting tool according to the invention. Wherein, FIG. 1A is a cross-sectional illustration for a preferable embodiment of the internal, active, and compensatory device for the axial bias-and-swing of the rotational main-shaft of a cutting tool according to the invention. FIG. 1B is a partially enlarged illustration for the push-proof bearing part of the mandrel in FIG. 1A. FIG. 2 is a block diagram illustration for the internal, active, and compensatory device for the axial bias-and-swing of the rotational main-shaft of a cutting tool according to the invention.

As shown in FIG. 1A and FIG. 1B, the internal, active, and compensatory device for the axial bias-and-swing of the rotational main-shaft of a cutting tool according to the invention is mainly comprised of two parts: a main-shaft device 10 and an active compensatory device 30. In the preferable embodiment according to the invention, the main-shaft device 10 is a main-shaft device of gas-floating type and, however, it may also be a main-shaft device of hydraulic pressure type, or the main-shaft device 10 of other types adapted for cutting hard-and-brittle materials (for example, silicon wafer, glass, and ceramic material, etc.) in high-speed rotation. The main-shaft device 10 may be installed on a cutting machine (not shown in the figure) to process the cutting job. Since the said cutting machines are all belonged to the prior arts and are not the technical characteristics pursued by the invention, so a detailed description of such kind of apparatus is not presented herein any further.

The main-shaft device 10 is mainly comprised of a mandrel 11, a cutting tool 12 connected to the front end of the mandrel 11, a push-proof bearing mechanism 13 used for processing the axial position of the mandrel 11, a motor 14 (i.e., a motor rotor) connected to the mandrel 11 for rotating it, a main-shaft main body 15 covered the outside of the mandrel 11 for providing a structural rigidity, a connection seat 17 arranged securely at the tail end of the main body 15 for providing a connection to the cutting machine (not shown in the figure), and several gas nozzles 18 and controlling connection heads 19. Since, when the push-proof bearing mechanism 13 accumulates the positioning ring 111 of the mandrel 11, it will generate axial space 112 (or gap) ranging from several micrometers to several ten micrometers approximately, so the mandrel 11 may make linear displacement of small amplitude (ranging from several micrometers to several ten micrometers approximately) along the axial direction relative to the main body 15 and, the invention thereby applies this space 112 to process the activation path needed by the axial compensation of the bias-and-swing for the cutting tool 12.

The internal, active, and compensatory device 30 is comprised of a sensor 31, a magnetic element 32, an electromagnetic element, and an electromagnetic controlling module 34.

In the preferable embodiment of the invention, the sensor 31 is a sensor of non-contacting type, for example, optical sensor, or electric capacitance, electromagnetic, or eddy current sensor, etc., which is connected to the outside of the front end of the main body 15 corresponding to a position near to the outer edge of the side surface of the cutting tool 12 and is kept an appropriate measuring gap with the cutting tool 12 to be able to sense the displacement quantity of the axial bias-and-swing of the cutting tool 12 relative to the main body 15 (i.e., relative to the sensor 31 itself).

The magnetic element 32, arranged securely to another tail end of the mandrel 11 relative to the cutting tool 12, may be a permanent magnet and, since it is connected integrally to the mandrel 11 as one body, so it may be rotated synchronically with the mandrel 11.

The electromagnetic element 33 is arranged in the interior of the main body 15 corresponding to the position of the magnetic element 32 and is kept an appropriate gap with the magnetic element 32. The electromagnetic element 33 may be an electric magnet preferably. Corresponding to an input of electric power, the electromagnetic element 33 may generate magnetic force, of which the distribution is preferably parallel to the axial direction of the mandrel 11, but it is not restricted to the parallel situation. Therefore, by controlling the input of the electric power to the electromagnetic element 33, it may control the electromagnetic element 33 to generate magnetic fields of different magnitudes and directions to further produce pushing forces or pulling forces in different degrees to the axis of the magnet element 32; such that the mandrel 11 together with the cutting tool 12 make an axial displacement of small amplitude relative to the main body 15. One characteristic of the invention: by matching the electromagnetic element 33 with the magnetic element 32 to form an activation module of non-contacting type, which can be arranged in the prior main-shaft device of gas-floating type under the situation without changing the original structure greatly and, it is further possible to make a fine tune on the axial compensation displacement of the mandrel 11 rotated in high-speed under the condition of no direct contact.

In the preferable embodiment of the invention, the electromagnetic controlling module 34, connected to the electromagnetic element 33, may receive the displacement quantity of axial bias-and-swing transferred from the sensor 31 to thereby control the electric power input to the electromagnetic element 33 to further generate an appropriate magnitude of pushing force or pulling force to the axis of the magnetic element 32, such that the mandrel 11 together with the cutting tool 12 are made a fine tune of compensation on the axial displacement for assuring the cutting point of the cutting tool 12 being always maintained at the right course and position determined in advance. Therefore, by applying the invention, the degree of the fissure of cutting route and the damage on the back of the work-piece possibly caused by the axial bias-and-swing of the cutting tool 12 may be decreased greatly, only one set of main shaft is needed to process one round of cutting process to reach a better cutting quality, and the shortcomings of the prior arts are completely overcome.

As shown in FIG. 2, in the preferable embodiment of the invention, the electromagnetic controlling module 34 is further comprised of an electromagnetic actuator 341 and a sub-controller 342 located at the exterior of the main shaft. The electromagnetic actuator 341 is provided for outputting electric power to the electromagnetic element 33 for generating magnetic force. The sub-controller 342 is connected between the sensor 31 and the electromagnetic actuator 341 and is located at the exterior of the main shaft to control the electric power output from the electromagnetic actuator 341 according to the displacement quantity of the axial bias-and-swing detected by the sensor 31. Further, the main-shaft device 10 is further comprised of a main controller 21 that is connected to both of the power source 22 and the motor 22 to control the rotation of the mandrel 11. The sub-controller 342 is connected to the main controller 21. The main controller 21 may transfer the data of the rotation speed of the rotational mandrel 11 to the sub-controller 342, which may decide the detecting frequency (or the sampling frequency) for the sensor 31 to detect the cutting tool 12 according to the received data of the rotation speed. In the meantime, through an operation interface 23, the main controller 21 and the sub-controller 342 may also transfer the data of the rotation speed of the rotational mandrel 11 and the signal data of the axial bias-and-swing of the cutting tool 12 sensed by the sensor to a screen 231 to be displayed. Through an input device 232, an operator may also control the main-shaft device 10 or the internal, active, and compensatory device 30. For example, when the rotation speed of the mandrel 11 that is under a operation procedure (i.e., the rotation speed of the cutting tool) is 15,000 rpm, we may set the detecting frequency of the sensor 31 to be matched with the rotation speed of the mandrel 11; namely, the detecting frequency (or the sampling frequency) of the sensor 31 is 250 Hz, such that the sensor 31 will sense the quantity of the axial bias-and-swing of the cutting tool 12 on a base of same phase. If we set the detecting frequency of the sensor 31 as an integer multiplication of the rotation speed of the mandrel 11, for example, adjusting the detecting frequency ten times to 2.5 kHz, then the cutting tool 12 can be sampled in ten phases and the axial bias-and-swing situation of each part of the cutting tool 12 during high speed rotation can be controlled surely. On the other hand, if the rotation speed of the mandrel 11 is made to be greater than the detecting frequency of the sensor 31, then the sampling number of the detection during unit time can be reduced and the load of the sub-controller 342 is also lowered down.

Figure 3:
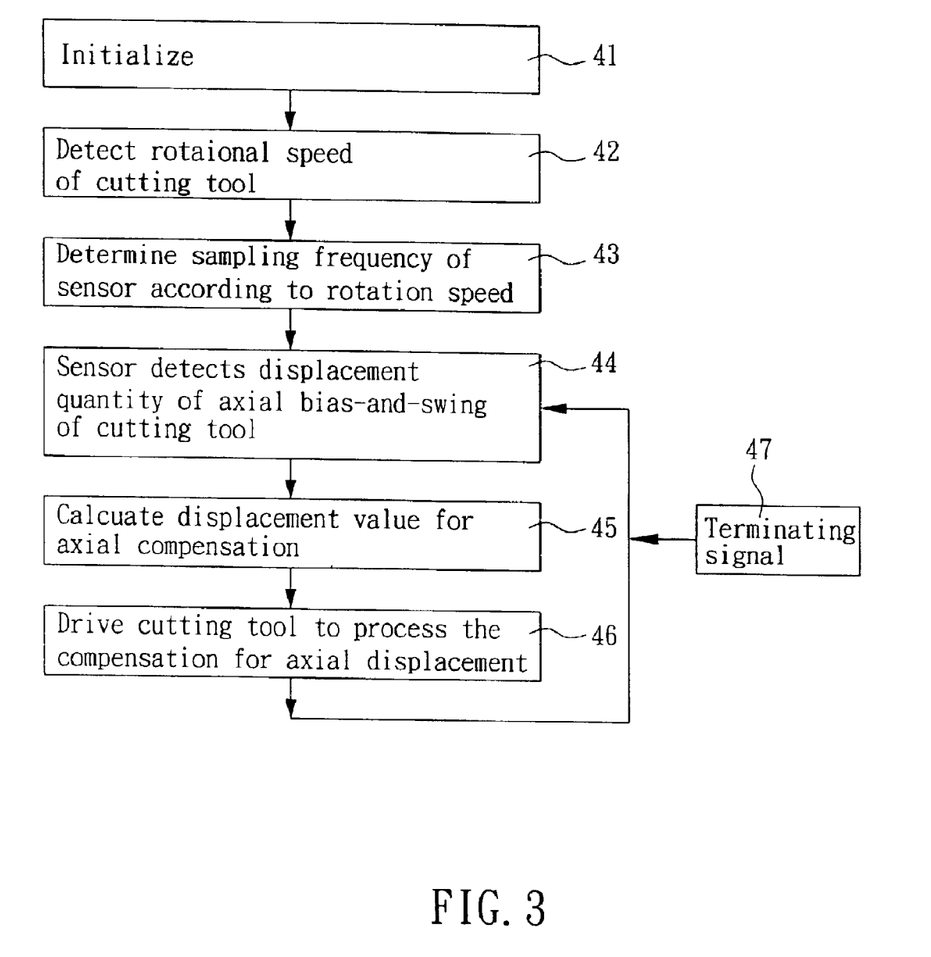
FIG. 3 is a flow chart for a preferable embodiment of the internal, active, and compensatory method for the axial bias-and-swing of the main shaft of a cutting tool according to the invention.
Figure 4:
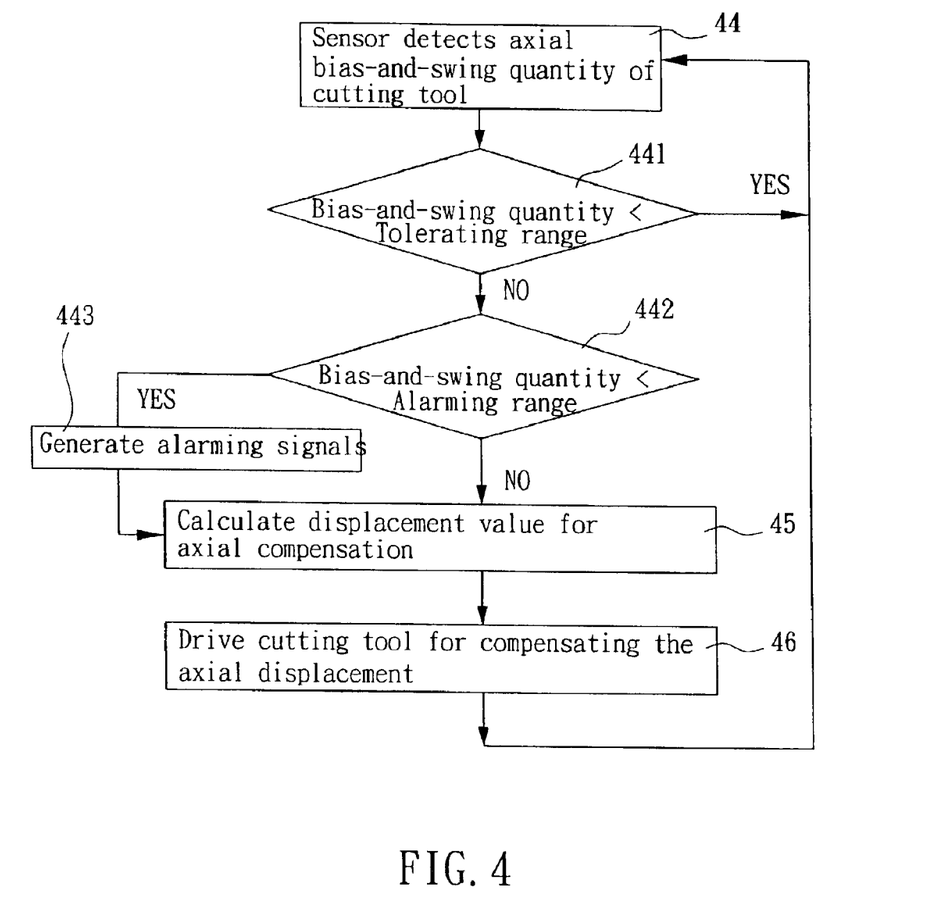
FIG. 4 is a flow chart for another preferable embodiment of the internal, active, and compensatory method for the axial bias-and-swing of the main shaft of a cutting tool according to the invention.

Please refer to FIG. 3 and FIG. 4, which are the flow charts of several preferable embodiments for the internal, active, and compensatory method for the axial bias-and-swing of the main shaft of a cutting tool according to the invention.

In FIG. 3, the internal, active, and compensatory method for the axial bias-and-swing of the rotational main-shaft of a cutting tool may be comprised of the following steps:

Step 41: Provide a main-shaft device 10 and an active compensatory device 30 as described therein before and, after initially setting the controlling parameters, start to run.

Step 42: Detect the rotation speed of the cutting tool 12 (i.e., the mandrel 11) with the main controller 21 of the main-shaft device 10, and transfer the data of the rotation speed to the electromagnetic controlling module 34 of the active compensatory device 30.

Step 43: The electromagnetic controlling module 34 decides the detecting-and-sampling frequency of the sensor 31 according to the received data of the rotation speed of the cutting tool 12.

Step 44: The sensor 31 detects the displacement quantity of the axial bias-and-swing of the cutting tool 12 and transfers the displacement quantity of the bias-and-swing to the electromagnetic controlling module 34.

Step 45: The electromagnetic controlling module 34 calculates the corresponding displacement for the axial compensation according to the displacement quantity of the bias-and-swing.

Step 46: The electromagnetic controlling module 34 controls the electromagnetic element 33 of the actuation module to drive the mandrel 11 to process an axial displacement for compensating the displacement quantity.

Step 44 to Step 46 described therein before will be proceeded repetitiously until the electromagnetic controlling module 34 receives a terminating signal and the steps will then be stopped. Of course, in another embodiment, the invention is also adapted for the cutting tool 12, of which the rotation speed is under the situation of dynamic variation. At this moment, the loop of the repetitious process may also be adjusted to execute from Step 42 to Step 46 repetitiously in order to correspond to the variation of the detecting frequency of the sensor 31.

Please refer to FIG. 4, which is another preferable embodiment for the internal, active, and compensatory method for the axial bias-and-swing of the rotational main-shaft of a cutting tool according to the invention. Mainly, several additional steps are further included between the Step 44 and the Step 45 of the flow chart shown in FIG. 3 as follows:

Step 44: The sensor 31 detects the quantity of the axial bias-and-swing of the cutting tool 12.

Step 441: Compare the displacement quantity of the bias-and-swing with a value of tolerating range that is predetermined and, when the displacement of the bias-and-swing exceeds the value of tolerating range, the electromagnetic controlling module 34 will then execute Step 45 and, if the displacement quantity of the bias-and-swing is within the value of tolerating range, then the electromagnetic controlling module 34 will not change the electric power output from the electromagnetic element 33, and the execution goes back to Step 44.

Step 442: Compare the displacement quantity of the bias-and-swing with a value of alarming range that is predetermined and, when the displacement quantity of the bias-and-swing exceeds the value of alarming range, the electromagnetic controlling module 34 will execute Step 443 to set off alarming signals and go to next step. If the displacement quantity of the bias-and-swing is still within the value of alarming range, then it will not set off alarming signals and the execution goes to Step 45 directly.

Step 45: The electromagnetic controlling module 34 controls the activation module to drive the mandrel 11 to proceed an axial displacement for compensating the displacement quantity.

In the preferable embodiment as shown in FIG. 4, a value of tolerating range for the displacement quantity of the axial bias-and-swing of a cutting tool 12 is determined in advance, for example, it may be set selectively around ±3 μm or other values. The value of tolerating range should be determined by depending on the work-piece materials in actual operation, the specification of a cutting tool, and the situation of the operation circumstance, etc. In general speaking, within the value of tolerating range, the degree of the bias-and-swing of the cutting tool will still not cause the situations of the fissure of the cutting route and the damage on the back of the work-piece yet, so that the internal, active, and compensatory device of the invention will reduce the over frequency of the adjustment of the mandrel position. The value of alarming range is then determined according to the degree of the excessive wearing-out of the cutting tool or other reasons that cause the cutting tool to bias and swing too excessively to cause a more serious situation for damaging the work-piece, (for example, the biasing-and-swinging value of the cutting tool is larger than about ±15 $\mu$m or other values) and, at this time, the invention will automatically set off alarming signals to inform the operator to make a further inspection.

In sum, the internal, active, and compensatory method and device for the axial bias-and-swing of the rotational main-shaft of a cutting too according to the invention only needs a main shaft to proceed one round of cutting procedure for obtaining a relatively better quality for cutting the hard-and-brittle materials, so that the shortcomings of the high cost and the complication of controlling system of the double sets of the main shaft applied by the prior technique are overcome. Furthermore, the invention is designed under the situation when the structure of the main shaft of the gas-floating type is not needed to change greatly and, therefore, the structure is relatively simple and the manufacture cost is also lower. In addition, by directly sensing the displacement quantity of the axial bias-and-swing of the [Cutting Tool] to make a fine tune of active compensation, a more accuracy of the position control of the cutting point may further be obtained, the damage situation on the back of the work-piece is reduced greatly, and the all sorts of the shortcomings of the prior arts are improved effectively.

What is claimed is:

1. An internal, active, and compensatory device for the axial bias-and-swing of the main shaft of a cutting tool, wherein the main shaft is comprised of a mandrel, a cutting tool connected to the front end of the mandrel, a motor rotor connected to the mandrel to bring along its rotation, and a main-shaft main body supported at the exterior of the mandrel and, along the axial direction, the mandrel is selected to make a linear displacement of small amplitude relative to the main body; the internal, active, and compensatory device is comprised of:
   a sensor, to sense the axial displacement of the bias-and-swing relative to the main body;
   a magnetic element, connected to the rear end of the mandrel and rotated synchronically with the mandrel; and
   an electromagnetic element, arranged in the interior of the main body and position rearward of the magnetic element and kept a distance from the magnetic element, to generate a magnetic force corresponding to an input of electric power for further producing an axial force to the magnetic element, such that the mandrel makes an axial displacement of small amplitude relative to the main body.

2. The internal, active, and compensatory device for the axial bias-and-swing of the main shaft of a cutting tool according to claim 1, wherein the main shaft is a main shaft of gas-floating type.

3. The internal, active, and compensatory device for the axial bias-and-swing of the main shaft of a cutting tool according to claim 1, wherein the cutting tool is adapted for cutting hard-and-brittle materials.

4. The internal, active, and compensatory device for the axial bias-and-swing of the main shaft of a cutting tool according to claim 1, wherein the magnetic element is a permanent magnet.

5. The internal, active, and compensatory device for the axial bias-and-swing of the main shaft of a cutting tool according to claim 1, wherein the electromagnetic element is an electromagnet.

6. The internal, active, and compensatory device for the axial bias-and-swing of the main shaft of a cutting tool according to claim 1, further comprising an electromagnetic controlling module, which is connected to the electromagnetic element, and which receives the displacement quantity of the axial bias-and-swing transferred from the sensor, and which thereby controls an electric power input to the electromagnetic element.

7. The internal, active, and compensatory device for the axial bias-and-swing of the main shaft of a cutting tool according to claim 6, wherein the electromagnetic controlling module is further comprised of an electromagnetic actuator and a sub-controller, and the electromagnetic actuator is provided for outputting electric power to the electromagnetic element for generating magnetic force, and the sub-controller is connected between the sensor and the electromagnetic actuator to control the electric power output from the electromagnetic actuator according to the displacement quantity of the axial bias-and-swing detected by the sensor.

8. The internal, active, and compensatory device for the axial bias-and-swing of the main shaft of a cutting tool according to claim 7, wherein the main-shaft device is further comprised of a main controller that is connected to the motor to control the rotation of the mandrel, and the sub-controller is connected to the main controller, which is selected to transfer the data of the rotation speed of the rotational mandrel to the sub-controller, which is selected to decide the detecting frequency (or the sampling frequency) for the sensor to detect the cutting tool according to the received data of the rotation speed.

9. The internal, active, and compensatory device for the axial bias-and-swing of the main shaft of a cutting tool according to claim 6 wherein, after the electromagnetic controlling module receiving the quantity of axial displacement of the bias-and-swing transferred from the sensor, it will compare the displacement quantity with a value of tolerating range that is determined in advance and, when the displacement quantity exceeds the value of tolerating range, the electromagnetic controlling module will then process a control of electric power input to the electromagnetic element.

10. The internal, active, and compensatory device for the axial bias-and-swing of the main shaft of a cutting tool according to claim 6 wherein, after the electromagnetic controlling module receiving the quantity of axial displacement of the bias-and-swing transferred from the sensor, it will compare the displacement quantity with a value of alarming range that is determined in advance and, when the displacement quantity exceeds the value of alarming range, the electromagnetic controlling module will set off alarming signals.

11. An internal, active, and compensatory device for the axial bias-and-swing of the main shaft of a cutting includes:
   a main-shaft device, which is further comprised of:
   a mandrel;
   a cutting tool, which is connected to a forward end of the mandrel; and
   a motor rotor, which is connected to the mandrel to bring along the mandrel and the cutting tool to rotate; and an active compensatory device, which is connected to the main shaft for providing an axial displacement compensation to the cutting tool, and which is further comprised of:

a sensor, which detects the cutting tool and is kept a distance from the cutting tool, and which senses the displacement quantity of the axial bias-and-swing of the cutting tool an activation module, to provide an axial force to the mandrel, such that the mandrel makes an axial displacement of small amplitude; and wherein the activation module is further comprised of:

a magnetic element, which is fixed to the rear end of the mandrel; and an electromagnetic element, which is located at a position rearward of the magnetic element and is kept at a distance from the magnetic element, and which receives the electric-power input controlled by the electromagnetic controlling module to thereby generate magnetic force; and an electromagnetic controlling module, which is connected to the activation module, and which receives the displacement quantity of the axial bias-and-swing transferred from the sensor to thereby control the activation module.

12. The internal, active, and compensatory device for the axial bias-and-swing of the main shaft of a cutting tool according to claim 11, wherein the main-shaft device is a device of gas-floating type.

13. The internal, active, and compensatory device for the axial bias-and-swing of the main shaft of a cutting tool according to claim 11, wherein the electromagnetic controlling module is selected, according to the rotation speed of the mandrel, to decide the detecting frequency of the sensor when the sensor detects the cutting tool.

14. The internal, active, and compensatory device for the axial bias-and-swing of the main shaft of a cutting tool according to claim 11 wherein, after the electromagnetic controlling module receiving the quantity of axial displacement of the bias-and-swing transferred from the sensor, it will compare the displacement quantity with a value of tolerating range that is determined in advance and, when the displacement quantity exceeds the value of tolerating range, the electromagnetic controlling module will then process a control of electric power input to the electromagnetic element.

15. An internal, active, and compensatory method for the axial bias-and-swing of the main shaft of a cutting tool is comprised of following steps:

(A) Provide an active compensatory device to be arranged at a main-shaft device, which is comprised of a mandrel, a cutting tool connected to a front end of the mandrel, and a motor rotor connected to the mandrel to bring along the mandrel and rotate the cutting tool, and the active compensatory device is comprised of a sensor that is selected to sense the quantity of the axial displacement of the bias-and-swing of the cutting tool, an actuation module that is selected to drive the mandrel to process an axial displacement of small amplitude, and an electromagnetic module that is selected to receive the quantity of axial displacement of the bias-and-swing transferred from the sensor and thereby control the actuation module;

(B) The sensor detects the quantity of the axial displacement of the bias-and-swing of the cutting tool and transfers the displacement quantity of the bias-and-swing to the electromagnetic controlling unit;

(C) According to the displacement quantity of the bias-and-swing, the electromagnetic module correspondingly calculates the displacement quantity of the axial compensation;

(D) The electromagnetic controlling module controls the actuation module to drive the mandrel to process the axial displacement of the displacement quantity of compensation;

(E) Provide a magnetic element, which is fixed to the rear end of the mandrel; and an electromagnetic element, which is located at a position rearward of the magnetic element and is kept at a distance from the magnetic element, and which is selected to receive the electric-power input controlled by the electromagnetic controlling module to thereby generate magnetic force.

16. The internal, active, and compensatory method for the axial bias-and-swing of the main shaft of a cutting tool according to claim 15 wherein, between Step (A) and Step (B), there are further included following steps:

(A1) Detect the rotation speed of the cutting tool;

(A2) According to the rotation speed of the cutting tool, the electromagnetic controlling module decides the detecting frequency sensed by the sensor from the cutting tool.

17. The internal, active, and compensatory method for the axial bias-and-swing of the main shaft of a cutting tool according to claim 15 wherein, between Step (B) and Step (C), there are further included following steps:

(B1) Compare the displacement quantity of the bias-and-swing with a value of tolerating range that is predetermined and, when the displacement quantity of the bias-and-swing exceeds the value of tolerating range, the electromagnetic controlling module will then execute the Step (C);

(B2) Compare the displacement quantity of the bias-and-swing with a value of alarming range that is predetermined and, when the displacement quantity of the bias-and-swing exceeds the value of alarming range, the electromagnetic controlling module will set off alarming signals.

18. The internal, active, and compensatory method for the axial bias-and-swing of the main shaft of a cutting tool according to claim 15, wherein the internal, active, and compensatory method will repetitiously execute Step (B) to Step (D) until a terminating signal is received.

* * * * *